United States Patent [19]

Ishii

[11] 4,409,596

[45] Oct. 11, 1983

[54] METHOD AND APPARATUS FOR DRIVING AN INK JET PRINTER HEAD

[75] Inventor: Hiroshi Ishii, Shiojiri, Japan

[73] Assignees: Epson Corporation, Nageno; Kabushiki Kaisha Suwa Seikosha, Tokyo, both of Japan

[21] Appl. No.: 291,904

[22] Filed: Aug. 11, 1981

[30] Foreign Application Priority Data

Aug. 12, 1980 [JP] Japan ............................... 55-110652
Aug. 25, 1980 [JP] Japan ............................... 55-116727

[51] Int. Cl.$^3$ ............................................ G01D 15/18
[52] U.S. Cl. ................................ 346/1.1; 346/140 R
[58] Field of Search ............................ 346/140 R, 1.1; 400/126

[56] References Cited

U.S. PATENT DOCUMENTS

| | | | |
|---|---|---|---|
| 4,068,144 | 1/1978 | Toye | 346/140 X |
| 4,104,646 | 8/1978 | Fischbeck | 346/140 R |
| 4,112,433 | 9/1978 | Vernon | 346/140 X |
| 4,266,232 | 5/1981 | Juliana | 346/140 R |
| 4,291,316 | 9/1981 | Kakeno | 346/140 R |

*Primary Examiner*—Joseph W. Hartary
*Attorney, Agent, or Firm*—Blum, Kaplan, Friedman, Silberman & Beran

[57] ABSTRACT

Conditions in the ink supply, nozzle and passages of an ink jet printer head are maintained in a state of dynamic equilibrium by application of a continuous flow of intermediate pulses to the piezoelectric transducer in the ejection system. The intermediate pulses are combined with selectively applied ejection pulses. Only the occurrence of an ejection pulse causes a droplet to be propelled from the printer head nozzle to the recording media. The intermediate pulses differ from the ejection pulses in amplitude, period or rate of change of the signal and transducer deflection produced, and occur at a frequency which prevents a return of static pressure equilibrium in the ink system between pulses. Gradation in printing can be produced from variation in time between intermediate and ejection pulses.

27 Claims, 14 Drawing Figures

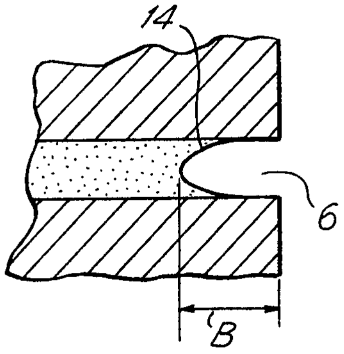
FIG. 3
PRIOR ART
FIG. 4a
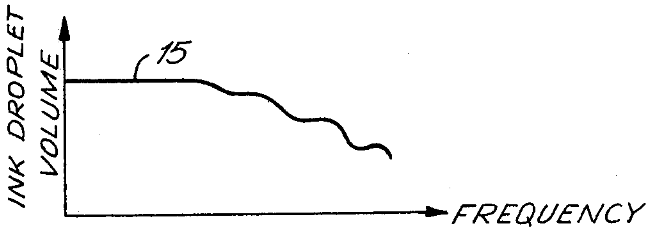
FIG. 4b
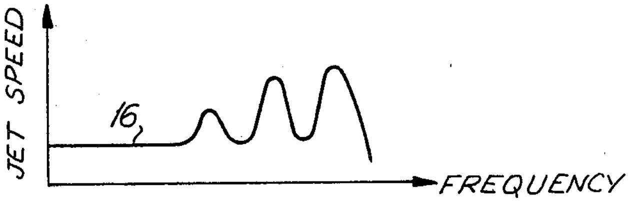
FIG. 4c
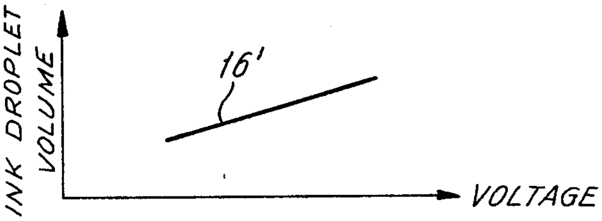

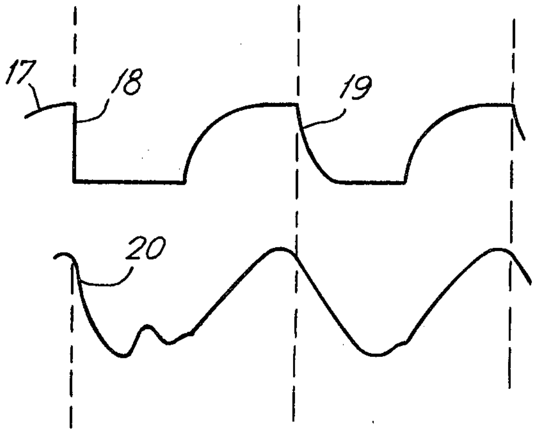
FIG. 5
FIG. 6
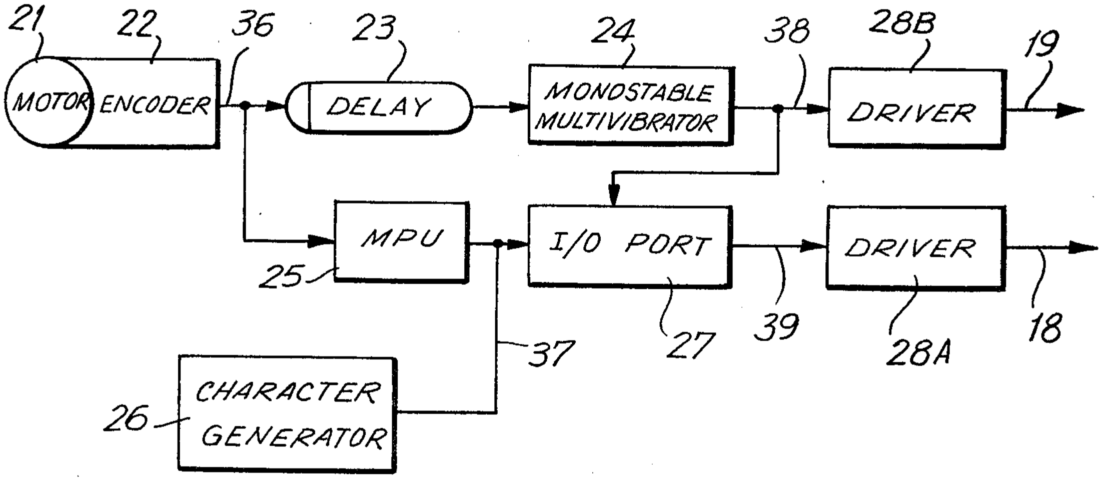

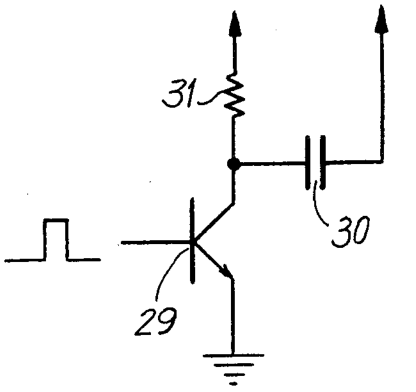
FIG. 7
PRIOR ART
FIG. 8
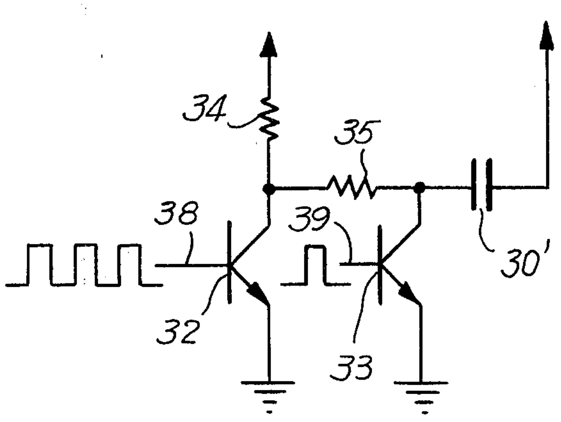

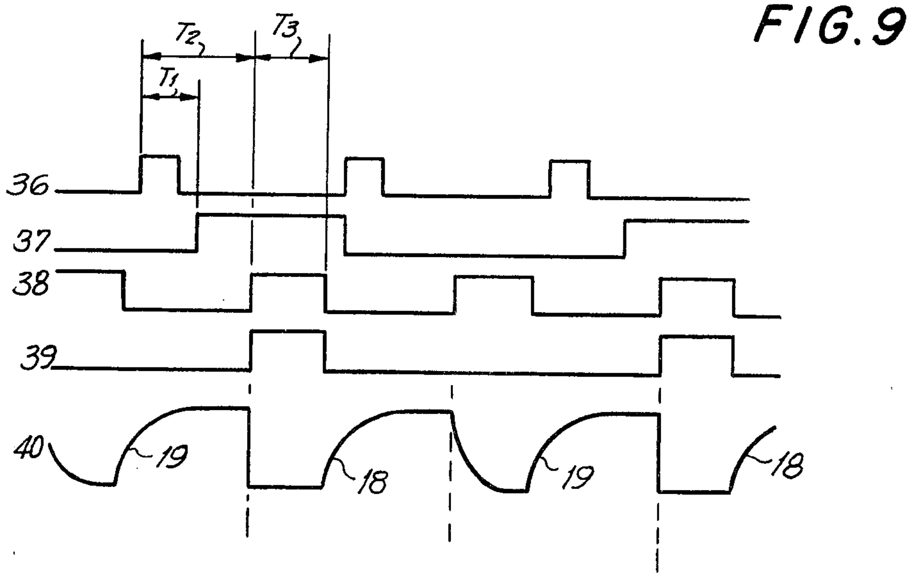
FIG. 9
FIG. 10
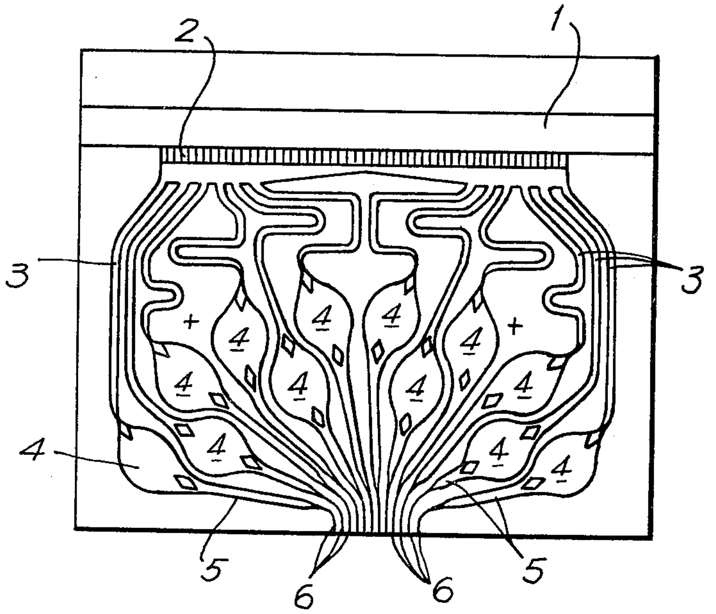

METHOD AND APPARATUS FOR DRIVING AN INK JET PRINTER HEAD

BACKGROUND OF THE INVENTION

This invention relates generally to a method and apparatus for driving a non-impact type printer, and more particularly, to a method and apparatus for driving an ink on-demand type jet printer head providing a wide range of gradation in the printed indicia. Gradation printing with an on-demand type ink jet printer head has heretofore been accomplished by changing the voltage amplitude of a drive pulse or by changing the pulse width of the drive pulse applied to the ink jet head. With these earlier techniques, the ink droplet volume ratio is in a range of only 1.5 to 2. From this ratio the resultant print can be given only 3 to 5 gradations in the density of the printed indicia. Thus, the conventional methods are not yet practical. Ink stagnation in the nozzle is also a problem when printer usage is intermittent.

In an on-demand type ink jet printer head, the drive period can be changed in a range from several hundreds of microseconds to infinity. Therefore, in order to improve and stabilize the print quality with the various characteristics of the head maintained unchanged at each drive frequency, it is necessary to set the maximum operating drive frequency much lower than the maximum frequency with which the head can actually jet ink. In particular, after each drive pulse, transient pressure waves exist in the ink supply system which require considerable time to dampen such that the starting conditions for each drive pulse are the same. When the starting conditions in the ink supply system are not stabilized at the time of the next drive pulse, the printed dots vary in quality and the overall quality of the printed matter is deteriorated.

What is needed is an ink jet printer head which operates at high speed and yet provides uniform quality of printing and density gradations.

SUMMARY OF THE INVENTION

Generally speaking, in accordance with the invention, a method and apparatus for driving an ink jet printer head especially suitable for high speed and high quality printing is provided. Conditions in the ink supply, nozzle and passages of an ink jet printer head are maintained in a state of dynamic equilibrium by application of a continuous flow of intermediate pulses to the piezoelectric transducer in the ejection system. The intermediate pulses are combined with selectively applied ejection pulses. Only the occurrence of an ejection pulse causes a droplet to be propelled from the printer head nozzle to the recording media. The intermediate pulses differ from the ejection pulses in period, amplitude or rate of change of the signal and transducer deflection produced, and occur at a frequency which prevents a return of static pressure equilibrium in the ink system between pulses. Gradation in printing results from variation in time between intermediate and ejection pulses.

Accordingly, it is an object of this invention to provide an improved method and apparatus for driving an ink jet printer head which operates with dynamic equilibrium and high printing speed.

Another object of this invention is to provide an improved method and apparatus for driving an ink jet printer head which provides many levels of gradation in printing.

A further object of this invention is to provide an improved method and apparatus for driving an ink jet printer head which provides printing of high quality at high speed.

Still another object of this invention is to provide a method and apparatus for driving an ink jet printer head which provides high quality printing after extended periods when no printing is performed.

Still other objects and advantages of this invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a sectional view to an enlarged scale of the nozzle tip portion of the ink jet printer head of FIG. 1;

FIGS. 4*a,b* and *c* are graphs indicating the effects of drive frequency and voltage on ink droplet characteristics;

FIG. 5 shows waveforms for driving an ink jet printer head in accordance with this invention and corresponding piezoelectric element displacement;

FIG. 6 is a functional block diagram of an ink jet printer head drive control circuit in accordance with this invention;

FIG. 7 is a schematic of a conventional ink jet printer head drive circuit;

FIG. 8 is a schematic of an ink jet printer head drive control circuit in accordance with this invention;

FIG. 9 is a timing chart for the drive control circuit of FIG. 8;

FIG. 10 is a diagram of an exemplary ink jet printer head having a plurality of nozzles;

DESCRIPTION OF THE PREFERRED EMBODIMENTS

Figure 1:
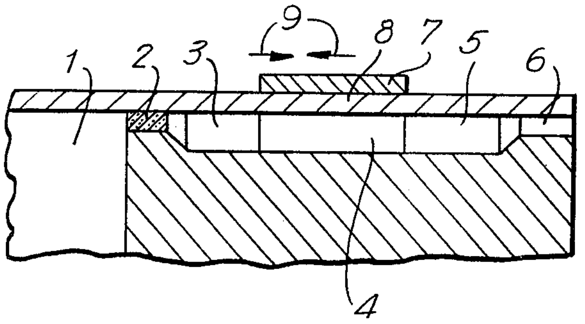
FIG. 1 PRIOR ART
FIG. 1 is a partial, functional diagram of an ink-on-demand type jet printer head of the prior art.

FIG. 1 is a functional sectional view of a prior art on-demand type ink jet printer head. Ink is supplied from an ink tank (not shown) to a reservoir 1 through tubing (not shown). The ink in the reservoir 1 is allowed to flow through a filter 2 to fill flow paths 3,5, a pressure chamber 4, and a nozzle 6. The supply of ink to the flow paths 3,5, pressure chamber 4 and nozzle 6 is effected principally by capillary action. When the flow paths 3,5, pressure chamber 4 and nozzle 6 are filled, a voltage pulse having a waveform 10 (FIG. 2) is applied to a piezoelectric element 7 attached to a vibrating plate 8 which forms one surface for the flow path 3,5, pressure chamber 4 and nozzle 6. The waveform is applied to the piezoelectric element 7 when a printing operation is to be carried out. As a result, a stress is produced which tends to contract the piezoelectric element 7 in the directions of the arrows 9. However, the vibrating plate 8, to which the piezoelectric element 7 is attached is not contracted. Therefore, the piezoelectric element 7 and the vibrating plate 8 bend inwardly toward the inner wall of the pressure chamber 4 and abruptly decrease the internal volume of the pressure chamber 4. As a result, the ink pressure in the paths 3,5, pressure chamber 4 and nozzle 6 increases rapidly and ink is discharged in the form of a droplet from the nozzle 6.

FIG. 7 shows a circuit for applying the voltage pulse 10 to the piezoelectric element 7. In FIG. 7, the transistor 29 is the output transistor of the driver. The resistor 31 is a discharge resistor. When the transistor 29 is turned on by input pulse, the capacitor 30 is rapidly charged through the transistor 29. When the transistor 29 is cut off, that is, when the input pulse is low, the capacitor 30 discharges through the resistor 31 to produce the typical RC curve at the trailing edge of the pulse 10. The capacitor 30 corresponds to the piezoelectric element 7 in FIG. 1. Many other circuits can be used; however, the circuit of FIG. 7 is one of the simplest in arrangement. For gradation in printing, the voltage (FIG. 4c) and/or the pulse width of the pulse 10 are varied.

An on-demand type ink jet printer head is superior to other types of ink jet printer heads in that, when printing is carried out as described above, the amount of energy required to effect the printing operation is small and it is unnecessary to provide an ink recovery mechanism as in a printer head providing a continuous flow of ink droplets. However, the on-demand type ink jet head still has problems. One typical problem is that printing speed is low. In order to overcome this problem, the on-demand type ink jet printer head is modified so as to have a plurality of nozzles, for example, as shown in FIG. 10. There a plurality of nozzles 6 are aligned on one face of the printer head with each nozzle 6 being independently supplied with ink through separate paths 3,5 and pressure chambers 4.

The most significant reasons for the low printing speed is that capillary action is utilized for fillng the paths and pressure chamber after ejection of an ink droplet. Another reason is the residual vibration of the ink and the piezoelectric element 7 after a pulse 10. A graph of the displacement of the piezoelectric element 7 relative to the pulse 10 is indicated in the waveform 11 in FIG. 2. There is a residual damping vibration during the period 12 which follows as the pulse 10 decays.

FIG. 3 shows a meniscus 14 which is formed in the nozzle 6 between the ink in the nozzle and the external atmosphere. A distance B between the end of the nozzle tip and inner most point of the meniscus varies in synchronism with the displacement 11 of the piezoelectric element 7. The variations in the distance B is shown in the graph 13 of FIG. 2.

Figure 2:
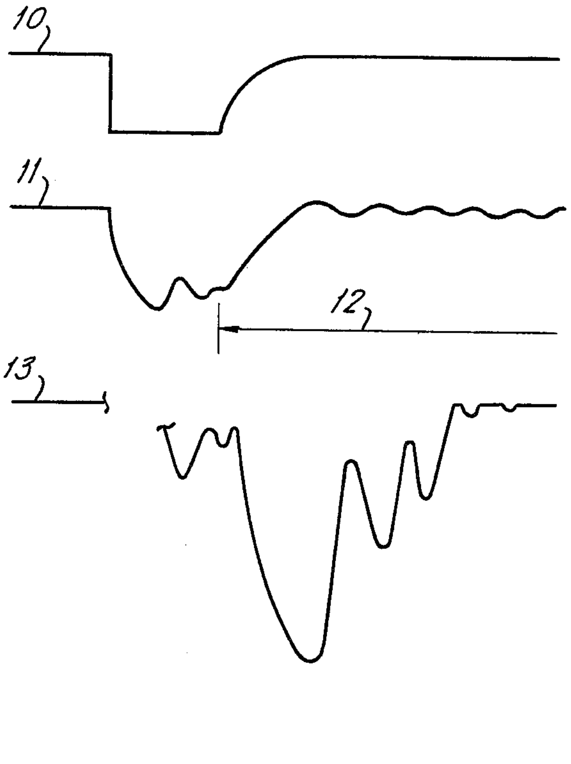
FIG. 2 PRIOR ART
FIG. 2 shows waveforms associated with the operation of the ink jet printer head of FIG. 1.

One characteristic of an on-demand type ink jet printer head is that the drive frequency is not constant. Therefore, the ink jetting condition is greatly changed by differences in the meniscus position and the energy of motion stored in the piezoelectric element 7 and in the ink at the moment when the drive pulse 10 is initially applied. The condition at the meniscus and in the energy of motion is particularly different where the drive period is long as compared to the case where the drive period is short. This creates problems related to the residual vibration occurring in the period 12 (FIG. 2).

In general, when the drive period is sufficiently long, that is, when the frequency of the drive signal is low and there is sufficient time 12 to dampen transient effect, the size of the ink droplets is relatively large (FIG. 4a) and the jet speed from the nozzle is low (FIG. 4b). As the drive period is decreased, the size of the ejected ink droplet gradually is reduced while being slightly vibrated (FIG. 4a). For very short drive periods, the volume of the ink droplets is reduced to about one-third of the volume of the ink droplets which are provided when the drive period is sufficiently long for substantially static equilibrium. If the drive period is further decreased, the ink is jetted from the nozzle 6 in a fog state with which printing cannot be achieved. As the drive period decreases the amplitude of the jet speed from the nozzle 6 is generally increased but there are large variations. Ultimately, when the jet speed is increased to about three times the jet speed which is obtained from a drive period of sufficient length to permit substantial static equilibrium, the jet speed abruptly decreases and as the drive period is further decreased, the ink is jetted in a fog state. The relationships between the drive period and frequency of the drive signal, and the ink droplet volume is indicated in the curve 15 of FIG. 4a, and the relationship between the drive period and frequency and ink jet speed is indicated in the curve 16 in FIG. 4b.

When the drive pulses 10 are provided at a frequency which is sufficiently low, the ink droplet volume of each drop is maintained within a certain range. Then, the ink droplet volume is increased in proportion to the voltage level of the applied drive pulse 10. By this technique the volume of the droplets can be increased from 1.5 to two times the volume which is obtained with a voltage amplitude which first causes a jet of ink to be provided from the nozzle 6. When the drive voltage is further increased in amplitude, the ink is jetted in a fog state and accordingly, printing cannot be achieved. The relationship between the driving voltage and the ink droplet volume is shown in the curve 16' of FIG. 4c.

The effects of ink droplet volume and jet speed on print quality is now described. Variations in ink droplet volume appear as variations in the printed dot area. Such variations do not affect the dot density. However, if the dot area variation exceeds approximately ±15% where no gradation is required, print quality is poor. On the other hand, where dot gradation is used in pattern production, when dot areas vary by 20% or more and the gradation level between the dots is larger or smaller by one step of gradation level, it is difficult to recognize the printed pattern.

The printed dot area correlates with the ink droplet volume, that is, the former is proportional to the latter as stated above. The jet speed is varied in accordance with the printer carriage running speed, the desired dot density, and the gap between the nozzle and the surface of the sheet for printing upon, as indicated by the following equation:

$$\Delta l = \frac{v_2 - v_1}{v_1 v_2} G_p V_c$$

where $\Delta l$=dot shift dimension $v_2-v_1$=jet speed variation $V_c$=carriage running speed $G_p$=gap between the nozzle and the printing sheet If $\Delta l$ increases at least 25% of the minimum dot distance, the resultant print appears satisfactory in quality.

In order to obtain a good print quality based on the above described characteristics, a minimum drive period for the print head should be set in a range so that, in the initial drive condition, the differences of the meniscus position and the energy stored in the piezoelectric element 7 cause no problems, that is, when the drive period is sufficiently long. The minimum drive period is set in the order of ten times the drive period which can be used to provide a jet of ink droplets rather than a fog and at conditions where printing can be achieved. More specifically, the heads response frequency is several hundred hertz. However, in such a construction, even when a multi-nozzle type head is employed, the frequency is very low for printing with any efficiency.

An object of the ink jet printer head in accordance with this invention is to elminate the above described difficulties and thereby improve print quality. More specifically, the ink jet printer head in accordance with this invention increases the heads response frequency to several thousand hertz or higher.

As stated above, the difficulties in the prior art ink jet printer heads are attributable to the variations of the ink drop volume and ink jet speed which occur when the drive period is too short. The variations and not the magnitudes of ink drop volume and jet speed are the difficulty in producing printed indicia of good quality. The characteristics of ink drop volume and jet speed can be corrected sufficiently by controlling the size of the nozzle 6 and amplitude of the drive voltage. To control print quality variations, the prior art employs a method of statically stabilizing the initial drive conditions by allowing sufficient time between each drive pulse. On the other hand, the ink jet printer head in accordance with this invention does not permit static stabilization to occur between driving pulses but uses a dynamic stabilization which produces constant initial drive conditions for each ejection pulse. By dynamically stabilizing the initial drive condition of the ink, the ink droplet volume within the same gradation level is stabilized, and as explained more fully hereinafter, the initial drive condition is positively changed in order to increase the range of gradation in the finished product.

With reference to FIG. 5, a waveform 17 shows a drive voltage signal in accordance with this invention. The drive signal 17 includes two different waveforms 18,19. The waveform 18 is entirely the same as the waveform of a conventional drive pulse 10 (FIG. 2). In the waveform 19, the change of voltage at the leading edge is slow as compared to the change of voltage initially in the waveform 18. The period of the pulses 18,19 in combination is constant at all times and coincides with a minimum drive period of the head which produces suitable ink droplets.

In operation, pulses 19 are applied to the piezoelectric element 7 with the minimum driving period at all times. Only when printing data is applied to eject a droplet and print a dot, is the signal changed into a pulse 18. The printing operation is carried out in this manner. Both pulses 18,19 have the same amplitude, and the magnitude of displacement of the piezoelectric element for a pulse 18 is entirely the same as when using only a conventional driving pulse 10 of the same amplitude. When the pulse 19 is applied, the absolute value of displacement of the piezoelectric element 7 is the same as that which is obtained when a pulse 18 is applied. However, the initial rate of change of displacement of the piezoelectric element is slower when the pulse 19 is applied.

In FIG. 5, the displacement of a piezoelectric element 7 is shown with the reference numeral 20. When a pulse 19 is applied to the piezoelectric element, the pressure in the pressure chamber is relatively gradually increased. Therefore, the ink jetting force cannot overcome the surface tension of the ink in the nozzle 6. Thus, after a meniscus which curves outwardly from the nozzle 6, the ink moves back into the nozzle. The meniscus is moved back into the nozzle in association with the return operation of the piezoelectric element which expands the ink chamber 4. However, it is unnecessary for the meniscus to reach equilibrium and return to the nozzle tip before the next pulse is applied because static stabilization is not a requirement of this flow circuitry and method of operation. When the initial drive condition is the same for each pulse, although not in static equilibrium, the reproducibility of the ink droplet volume and the jet speed is maintained at a high level.

The meniscus position and the motion energy in the initial drive period for a pulse next following a pulse 18 may be different from the initial meniscus position and motion energy at the initial drive period of a pulse following the pulse 19. However, in accordance with experiments, the ink droplet volume scarely changes, and a difference could not be measured. Further, the jet speed variation was 10% or less. It is believed that the small effect as described above rsults from the fact that in both cases, the return operation of the piezoelectric element 7 is the same. This return effect appears to be the dominant factor.

A control circuit employed where the ink jet printer head and method in accordance with this invention are applied is now described with reference to FIGS. 6 and 9. The rotational angle of a carriage moving motor 21 is detected by an encoder 22. Since the speed of the motor 21 is controlled, the output waveform 36 of the encoder 22 has a stable frequency. With the rise of the encoder output wave form 36, an MPU 25 (microprocessor unit) reads data out of a character generator 26 and applies the data to an input/output port 27. The time $T_1$ required for the operation of data readout depends on the input data. Therefore, a time $T_2$, that is, the maximum time required for reading out the data plus a factor, is set by a delay circuit 23, and an output signal 39 from the input/output port 27 is provided at a preselected frequency with a preselected time delay $T_2$ from the rise of the encoder output 36. A drive pulse width $T_3$ is set by a monostable multi-vibrator 24. The output 39 of the input/output port 27 is applied to a driver 28A so that an ink jet driving pulse 18 is applied to the piezoelectric element 7.

The above described operation is basically the same as in the conventional drive method. However, in accordance with this invention, a continuous flow of driving pulses 19 is added to the above described circuit through a driver 28B. The input of the driver 28B is not applied from the input/output port 27 but the output 38 of the monostable multi-vibrator 24 is applied directly to the driver 28B.

FIG. 8 is a circuit comprising the drivers 28A,28B. In the drive circuit, a transistor 32 is the output transistor of the continuous driving driver 28B, and a transistor 33 is the output transistor of the ink jet driving driver 28A. The collectors of the transistors 32,33 are connected by a charge and discharge resistor 35, and the circuit further includes a discharge resistor 34 connected to the collector of the transistor 32. When only the transistor 32 is driven with the rectangular signal 38, the voltage across the capacitor 30′ changes potential smoothly as shown in the pulse waveform 19 of FIG. 5. That is, when the transistor 32 is turned on by a positive going pulse 38, the capacitor 30′ is charged through the resistance 35 and the transistor 32. Current also flows through the resistor 34 and transistor 32 in series. When the transistor 32 is cut off, that is, when the signal 38 is low, the capacitor 30′ discharges through the resistors 34,35 to produce the typical RC curve at the trailing edge of the pulse 19.

When both transistors 32,33 are driven simultaneously (FIG. 9), the output waveform across the capacitor 30′ is the same as the pulse 18 in FIG. 5. That is, when both transistors go on simultaneously, the capacitor 30′ charges substantially instantaneously through the transistor 33, but when both transistors 32,33 are simultaneously cut off, the capacitor 30′ discharges again through the resistors 34,35 in series. Therefore, the trailing portions of pulses 18 and 19 are identical in showing the RC characteristic curve, but the leading edges of the pulses 18 and 19 differ. The pulse 18 has a squared leading edge whereas the leading edge of the pulse 19 is another RC characteristic curve.

The piezoelectric element 7 of the printer head is the capacitor 30′ in the circuit of FIG. 8. Thus, the pulses 18,19 are applied to the piezoelectric element to deflect the vibrating plate 8 and change the internal volume of the pressure chamber 4 as described above.

Figure 11:
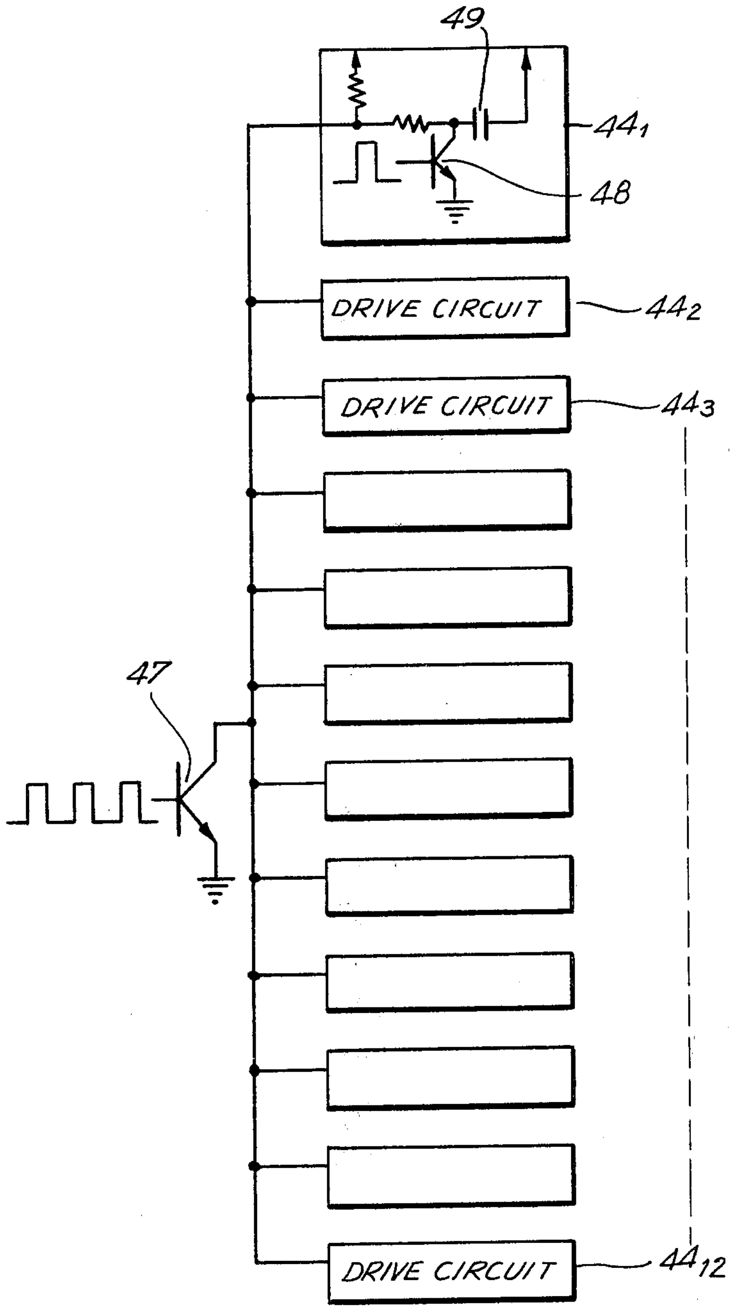
FIG. 11 is semi-schematic circuit diagram of a drive circuit for a multi-nozzle type ink jet printer head in accordance with this invention.

The number of transistors in the circuit of FIG. 8 is increased by one as compared to the conventional circuit of FIG. 7. However, in a construction of a multi-nozzle arrangement, with the same drive timing, the transistor 32 can drive in a parallel arrangement all of the piezoelectric elements provided for all of the nozzles (FIG. 10). In FIG. 10, twelve nozzles 6 with their associated pressure chambers 4 and flow paths 3,5 are provided in a compact arrangement. Using the prior art driving circuit of FIG. 7, twelve output transistors are required. In a driver circuit in accordance with this invention, the number of output transistors is 13 as illustrated in FIG. 11. It will be apparent that the transistor 47 in FIG. 11 corresponds to the transistor 32 of FIG. 8 and the transistor 48 in FIG. 11 corresponds to the transistor 33 in FIG. 8. The capacitor/piezoelectric element 49 of the driver block $44_1$ corresponds with the capacitor/piezoelectric element 30′ of FIG. 8. The functional blocks $44_{2-12}$ are similar to the driver $44_1$. Individually timed driving pulses 18 are selectively applied to the transistors in the drivers $44_{1-12}$ but common pulses 19 are applied simultaneously to all functional blocks 44 by the transistor 47. Thus, one additional transistor 47 serves twelve conventional driving circuits 44 into a driving circuit relying on dynamic equilibrium in accordance with this invention.

In the embodiment of an ink jet printer head apparatus in accordance with this invention as described above, pulses 19 are applied at all times and the pulse 18 is applied only when printing is carried out by the ejection of an ink droplet from a nozzle. However, the same effects can be obtained from a control circuit in which one through several pulses 19 are applied before a pulse 18 is applied. The alternate occurrence of pulses 18,19 is simple for control, and the latter concept where several pulses 19 separate the pulses 18 is economical in the use of electrical power.

The change in voltage of the leading edge of the pulse 19 is slow when compared with the change in voltage at the leading edge of the pulse 18. However, substantially the same effects of dynamic stability can be obtained by making the voltage lower on the pulse 19 than the level of voltage on the pulse 18. Furthermore, both the rate of change of voltage and the voltage amplitude of the pulse 19 can be reduced as compared to the wave shape of the pulse 18. These two techniques are effective in reducing the drive pulse width.

Thus, in an ink jet printer head using dynamic equilibrium in accordance with this invention, the drive frequency of the on-demand type ink print head is improved by about ten fold without degrading the print quality.

Figure 12:
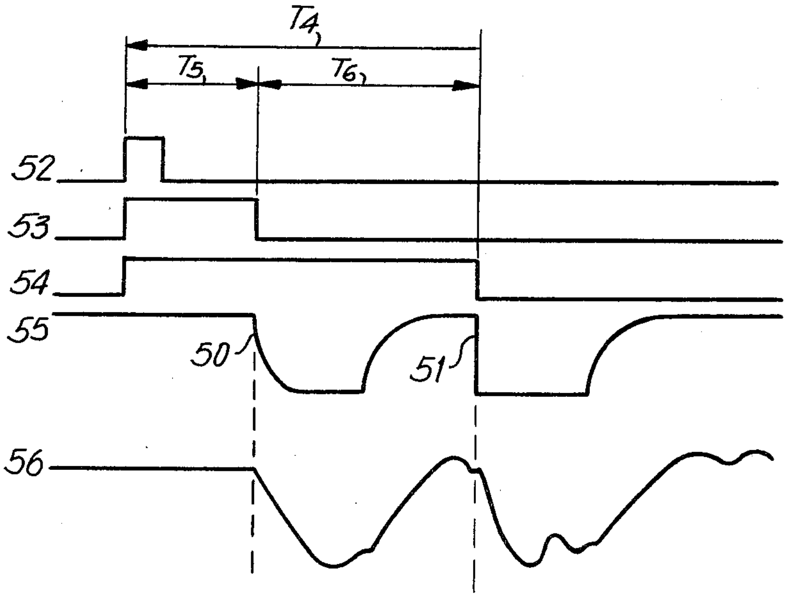
FIG. 12 is a timing diagram similar to FIG. 9 associated with the drive control circuit in accordance with this invention.

A driving method in accordance with this invention to provide gradation in printing is described with reference to FIG. 12. A timing pulse 52 is generated in synchronization with the movement of the carriage as by an encoder 22. A driving pulse 51 having a wave shape suited to eject an ink droplet from the nozzle 6 is applied to the piezoelectric element 7 at a predetermined time $T_4$ after the rise of the timing pulse 52. A driving pulse 50, having a gradually changing leading edge so as to be incapable of ejecting an ink droplet is applied to the piezoelectric element 7 after a time delay $T_5$ after the rise of the timing pulse 52. The delay time $T_5$ corresponds to gradation data, for example, stored in the character generator 26 and read out by the MPU 25. A drive pulse 50 which does not jet ink always is applied before that of a drive pulse 51 which does jet ink. The delay time $T_5$ is variably set so that as, in accordance with the print data, the gradation level is, for example, reduced, that is, the ink droplet volume is decreased, the delay time $T_5$ is increased. Accordingly, as the gradation of the printing data is decreased, the time interval $T_6$ between the drive pulses 50 and 51 is decreased. Conversely, when higher density printing is required, the interval $T_6$ is increased. The displacement 56 of the piezoelectric element produced by the drive pulse 51 is of the same magnitude as that produced by the drive pulse 50. However, the rate of change in the displacement is slower when the drive pulse 50 is applied as described with relation to the pulses 18 and 19.

When a pulse 50 is applied to the piezoelectric element, the pressure in the pressure chamber is more gradually increased. Therefore, the force acting on the ink cannot overcome the surface tension of the ink. Thus, after a meniscus which curves outwardly of the nozzle 6, the ink moves back into the nozzle 7. The meniscus is moved back into the nozzle in association with the return operation of the piezoelectric element 7. However, it is unnecessary for the meniscus to return to the proximity of the nozzle tip before the next pulse arrives because as stated above, static stabilization is not required in the driving method in accordance with this invention. If the initial drive condition is the same for each pulse, the reproducibility of the ink drop volume and the jet speed is maintained. As the pulses 50,51 are of the same shape at their trailing edges where the piezoelectric element 7 returns to its original condition, the positions of the meniscus in the return operations are substantially the same following both pulses 50 and 51. The positions of the meniscus are similar to those shown in the curve 13 of FIG. 2.

Whereas in prior art ink jet printer heads the drive pulse voltage amplitude is changed to change the ink droplet volume and to perform gradation printing, in accordance with the ink jet printer head of this invention, the interval between two different forms of drive pulses is changed to vary the ink droplet volume. That is, in accordance with this invention, a drive pulse interval is selected to operate in the portion of the curve 15 of FIG. 4 having negative gradient. Where the print data calls for a lower dot density, the drive pulse interval is decreased to thereby decrease the ink droplet volume. It is to be noted that in this method it is unnecessary to change the speed of the carriage.

To perform gradation printing, the time interval between the application of the consecutive drive pulses is changed. For this purpose, when the printing data is applied, the drive pulse for jetting ink is produced with a constant frequency in synchronization with the printer carriage. The pulses 50,51 are closer together when a lower density of printing is required.

When printing data is not applied, that is, when a droplet of ink is not required from the nozzle, the drive pulse 51 is not applied and only the drive pulse 50 is applied. The unevenness of the negative-gradient portion of the curve 15 of FIG. 4 causes no problem if the time delay $T_6$, which corresponds to the required gradation, is set taking the unevenness of the curve 15 into account. As is apparent from the curve 15 in FIG. 4, the ink is not atomized to a fog and the ink droplet volume varies in size over a range greater than three when comparing the smallest with the largest drops. Therefore, in accordance with this invention, printing having nine to eleven levels of gradation can be provided.

It will thus be seen that the objects set forth above, among those made apparent from the preceding description, are efficiently attained and, since certain changes may be made in carrying out the above method and in the construction set forth without departing form the spirit and scope of the invention, it is intended that all matter contained in the above description and shown in the accompanying drawings shall be interpreted as illustrative and not in a limiting sense.

It also to be understood that the following claims are intended to cover all of the generic and specific features of the invention herein described and all statements of the scope of the invention which, as a matter of language, might be said to fall therebetween.

What is claimed is:

1. A method of expelling ink droplets on demand from an ink jet printer head to effect printing, said head including a combination of a single pressure chamber, a nozzle, a flow path connecting said chamber to an ink source, a flow path connecting said chamber to said nozzle, and a transducer element associated with said single chamber, said transducer element when driven altering the internal volume of said pressure chamber, a driver circuit for driving said transducer element, comprising the steps of:

(a) generating driver pulses of a first waveform and amplitude in said driver circuit;

(b) continuously applying said pulses of said first waveform and amplitude to drive said transducer element when droplet expulsion is not desired;

(c) selectively generating a driving pulse of a second waveform and amplitude in said driver circuit whenever a droplet is demanded;

(d) applying said pulse of said second waveform after a pulse of said first waveform to drive said transducer element and to effect droplet ejection, only said pulse of said second waveform imparting sufficient energy to said transducer at a rate sufficient to cause a droplet to eject from said nozzle.

2. The method as claimed in claim 1, and further comprising the step;

(e) varying the time delay between said pulses of said first and said second waveforms, whereby the volume of the ejected drop is varied in proportion of the duration of the time delay.

3. The method as claimed in claims 1 or 2, wherein said pulses of said first and second waveforms are of equal amplitude and period.

4. The method as claimed in claim 1 or 2, wherein said pulse of said second waveform has a greater rate of change in voltage at the leading edge thereof than the rate of change of voltage at the leading edge of said pulse having said first waveform.

5. The method as claimed in claim 3, wherein said pulse of said second waveform has a square leading edge, and said pulse of said first waveform has a characteristic RC curvature at the leading edge.

6. The method as claimed in claim 3, wherein the trailing edges of said pulses of said first and second waveforms are similar in contour.

7. The method as claimed in claim 4, wherein the trailing edges of said pulses of said first and second waveforms are similar in contour.

8. The method as claimed in claims 1 or 2, wherein said pulse of said first waveform has a lesser amplitude than the pulse of said second waveform.

9. The method as claimed in claims 1 or 2, wherein the pulse of said first waveform has a lesser pulse width than the pulse of said second waveform.

10. The method as claimed in claims 1 or 2, wherein said pulse of said first waveform has a lesser amplitude and lesser pulse width than the pulse of said second waveform.

11. The method as claimed in claim 2, and further comprising the following steps preceding step (a):

1. detecting the position of the printer head relative to a medium to be printed upon;
2. measuring a fixed time delay after said position detection, said pulse of said second waveform being applied after said fixed time delay.

12. The ink jet printer head as claimed in claim 1, wherein said transducer element is a piezoelectric element.

13. An ink jet printer head comprising in combination:

a single pressure chamber for containing ink;

a nozzle;

a flow path connecting said chamber to an ink source;

a flow path connecting said chamber to said nozzle;

a transducer element, said transducer element when driven altering the internal volume of said pressure chamber;

a driver circuit for driving said transducer element, said driver circuit being adapted to output pulses to said transducer element having a first waveform and amplitude and a second waveform and amplitude, said first and second waveforms being different, said pulses of said second waveform being shaped to cause a droplet to be ejected from said nozzle and said pulse of said first waveform being shaped to alter the internal volume of said pressure chamber without expelling an ink droplet from said nozzle, each said pulse of said second waveform following a pulse of said first waveform.

14. The ink jet printer head as claimed in claim 13, wherein said different pulses are of the same amplitude and duration.

15. The ink jet printer head as claimed in claim 13, wherein said different pulses are of different amplitudes and durations.

16. The ink jet printer head as claimed in claim 13, wherein said transducer is a piezoelectric element which acts as a capacitor in said driver circuit.

17. The ink jet printer head as claimed in claims 13, 14 or 15, and further comprising means for varying the time period between said pulses of different waveform, the volume of said ejected droplet varying in proportion to the duration of said time period.

18. The ink jet printer head as claimed in claim 17, and further comprising means for detecting and signalling the position of the printer head relative to a medium to be printed upon, and delay means for triggering said pulse of said second waveform at a fixed time after a detection signal.

19. The ink jet printer head as claimed in claim 13, wherein said volume alteration is initially a volume reduction upon application of said pulses.

20. An ink jet printer head comprising;
- a pressure chamber for containing ink;
- a nozzle;
- a flow path connecting said chamber to an ink source;
- a flow path connecting said chamber to said nozzle;
- a piezoelectric element, said piezoelectric element when driven altering the internal volume of said pressure chamber;
- a driver circuit for driving said piezoelectric element, said piezoelectric element acting as a capacitor in said driver circuit, said driver circuit being adapted to output pulses to said piezoelectric element having a first waveform and a second waveform, said first and second waveforms being different, said pulses of said second waveform being shaped to cause a droplet to be ejected from said nozzle and said pulse of said first waveform being shaped to alter the internal volume of said pressure chamber without expelling an ink droplet from said nozzle, said pulse of said second waveform following a pulse of said first waveform, the capacitance of said piezoelectric element being charged by direct connection across a voltage source to produce the leading edge of said pulse of said second waveform, and said piezoelectric element capacitance being charged in series with a resistance to produce the leading edge of said pulse of said first waveform.

21. A method of expelling ink droplets on demand from an ink jet printer head including a single pressure chamber, a nozzle, a flow path connecting said chamber to said nozzle, and means for altering the volume of said pressure chamber in response to a signal applied thereto, comprising the steps of:
- (a) applying a first signal to said means for altering the volume, said first signal not expelling ink from said nozzle, said first signal being repetitively applied;
- (b) selectively applying a second signal to said means for altering said chamber volume, said second signal causing the expelling of an ink droplet from said nozzle, said second signal being applied following the application and completion of at least one of said first signals.

22. The method as claimed in claim 21, and further comprising the step:
- (c) varying the volume of said expelled ink droplet by varying the time between the initiation of said second signal and said first signal immediately preceding said second signal.

23. A method as claimed in claim 22, and further comprising the step;
- (d) applying additional first signals and selective second signals, said second signals being in synchronism with the movement of said ink jet printer head relative to a print media for printing thereon, the time elaspsing between said first and second signals being variable, whereby regular spacing and gradation of printed dots is provided.

24. The method of claim 1 or 21, wherein said volume alteration is initially a volume reduction upon application of said pulses.

25. The method as claimed in claim 21, wherein said means for altering the volume includes a piezoelectric element, said element when energized causing deflection in at least one wall of said pressure chamber.

26. An ink jet printing apparatus comprising:
- an ink jet printer head including a pressure chamber, a nozzle, a flow path connecting said chamber to an ink source, a flow path connecting said chamber to said nozzle and a transducer element, said transducer element when driven altering the internal volume of said pressure chamber;
- a driver circuit for driving said transducer element, said driver circuit being adapted to output pulses to said transducer element having a first waveform and a seconsd waveform, said first and second waveform being different, said pulses of said second waveform being shaped to cause a droplet to be ejected from said nozzle and said pulse of said first waveform being shaped to alter the internal volume of said pressure chamber without expelling an ink droplet from said nozzle;
- means for detecting and signalling the position of said printer head relative to a medium;
- first delay means for triggering said pulse of said second waveform at a fixed time after a detection signal;
- second delay means for triggering said pulse of said first waveform at a time corresponding to gradation data after said detection signal.

27. An ink jet printing apparatus comprising:
- an ink jet printer head including a pressure chamber, nozzle, a flow path connecting said chamber to an ink source, a flow path connecting said chamber to said nozzle and a transducer element, said transducer element when driven altering the internal volume of said pressure chamber;
- a driver circuit for driving said transducer element, said driver circuit being adapted to output pulses to said transducer element having a first waveform and a second waveform, said first and second waveforms being different, said pulses of said second waveform being shaped to cause a droplet to be ejected from said nozzle and said pulse of said first waveform being shaped to alter the internal volume of said pressure chamber without expelling an ink droplet from said nozzle, capacitance of said transducer element being charged by direct connection across a voltage source to produce the leading edge of said pulse of said second waveform, said capacitance of said transducer element being charged in series with a resistance to produce the leading edge of said pulse of said first waveform; and said pulse of said second waveform is applied on demand to said driver circuit in synchronism with a print head position detecting signal when printing is carried out by the ejection of an ink droplet from said nozzle, and said pulse of said first waveform is applied to said driver circuit in synchronism with said detecting signal at all times even when printing is not desired.

* * * * *